United States Patent [19]
Achtnig et al.
[11] Patent Number: 4,642,723
[45] Date of Patent: Feb. 10, 1987

[54] A HEAT PROTECTION DEVICE FOR OVERVOLTAGE ARRESTER MAGAZINES

[75] Inventors: Peter Achtnig; Gunter Hegner, both of Berlin, Fed. Rep. of Germany

[73] Assignee: Krone GmbH, Berlin, Fed. Rep. of Germany

[21] Appl. No.: 618,997

[22] Filed: Jun. 11, 1984

[30] Foreign Application Priority Data

Jul. 1, 1983 [DE] Fed. Rep. of Germany ....... 3323687

[51] Int. Cl.⁴ ................ H02H 3/22
[52] U.S. Cl. ................ 361/124; 361/119; 361/129
[58] Field of Search ................ 361/124, 129, 119

[56] References Cited

U.S. PATENT DOCUMENTS 4,002,952 1/1977 Menninger ................ 361/124
4,086,648 4/1978 Hinet et al. ................ 361/124

FOREIGN PATENT DOCUMENTS 3014796 6/1982 Fed. Rep. of Germany .......... 83/13
0027061 4/1981 France ................ 361/124

*Primary Examiner*—A. D. Pellinen
*Assistant Examiner*—Jeffrey A. Gaffin
*Attorney, Agent, or Firm*—Weingarten, Schurgin, Gagnebin & Hayes

[57] ABSTRACT

A heat protection device for overvoltage terminal block arrester magazines having with two-way arresters or with button arresters. According to the present invention, an S-shaped clip spring or an L-shaped clip spring is inserted in a button arrester of the 6×6-type or the 6×8-type. The clip provides one leg of the protection device having a solder preform and a switch contact to complete the circuit. In case of an overvoltage, the arc developed in the arrester causes the solder preform to melt off during an extended application of heat arising from the arrester, activating the switch contact and short-circuiting the leg of the arrester.

6 Claims, 6 Drawing Figures

A HEAT PROTECTION DEVICE FOR OVERVOLTAGE ARRESTER MAGAZINES

Figure 1:
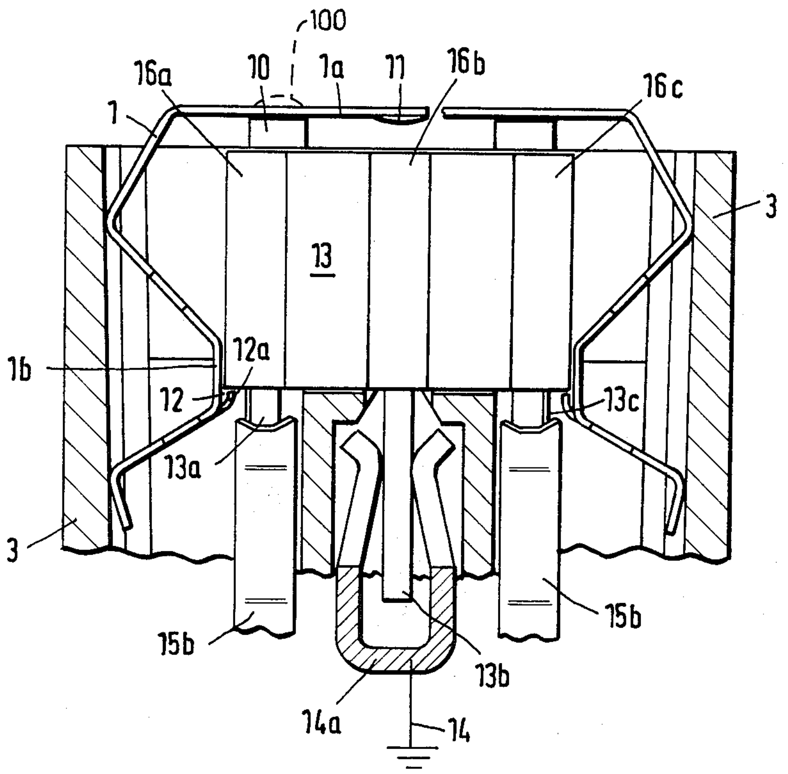

The invention relates to a heat protecting device for overvoltage arresters assembled in magazines (briefly: LSA-PLUS magazines) adapted to be plugged into terminal blocks loaded with solderless, non-screwed and stripping-free terminals having a polytropic air gap (KRONE-LSA-PLUS-Kontakte ®).

A heat protection device for overvoltage arresters has been known from the DE-OS 2,555,794 and the DE-PS 2,428,266. In these plug-in magazins for disconnecting blocks, the arresters and the magazine are protected by a solder preform resting on the end face. The solder preform will melt off at high temperatures.

In this case the overvoltage current is conducted to ground potential by short-circuiting of the arrester.

The invention is based on the objective of providing a heat protection device for the two-way overvoltage arresters mounted in the LSA-PLUS plug-in magazines and for the button arresters on the 6×6- and the 6×8-type. In case of an overvoltage and an overvoltage current of longer duration, the heat protection device is intended to short-circuit the arc developed in the arrester and thus to conduct the overvoltage current to ground potential. Thereby intense heating of the arrester and resulting damage to the overvoltage arrester magazine are to be prevented. Finally, the assembly of such a protection device in known plug-in magazines at a later date is to be made possible. The subject matter of the invention by means of which said objective is solved is a heat protection device for overvoltage arresters assembled in magazines adapted to be plugged into terminal blocks loaded with solderless, non-screwed and stripping-free terminals having a polytropic air gap (=LSA-PLUS terminals), which is characterized in that for each spark gap of a known two-way arrester an S-shaped clip spring is adapted to be plugged into an overvoltage arrester magazine, said clip spring being provided on one leg thereof with a solder preform and a switch contact and on the other leg thereof with a latching means; alternatively, for the spark gap of a known button arrester an L-shaped clip spring is adapted to be plugged into an overvoltage arrester magazine, said clip spring being provided on one leg thereof with a solder preform and a switch contact and on the other leg thereof with a latching means.

An embodiment of the first alternative provides that the latching means of the S-shaped clip spring comprises two resilient tabs adapted to engage beneath the two-way arrester.

An embodiment of the second alternative provides that the latching means of the L-shaped clip spring consists of a resilient tab adapted to engage in an opening of a known contact element of a contact spring.

Preferably, the solder preform rests on the outer diameter of the arrester and thereby keeps the switch contact in spaced relationship to a respective ground potential.

Appropriately, in operation the solder preform is either retained wedged between the arrester and the clip spring or is fixedly joined to the clip spring through a rivet joint.

Figure 1A:
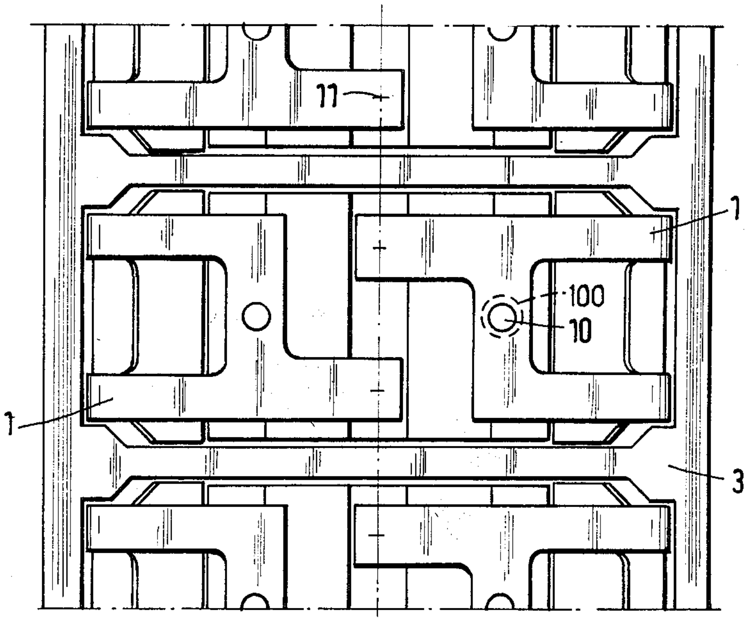
Figure 2:
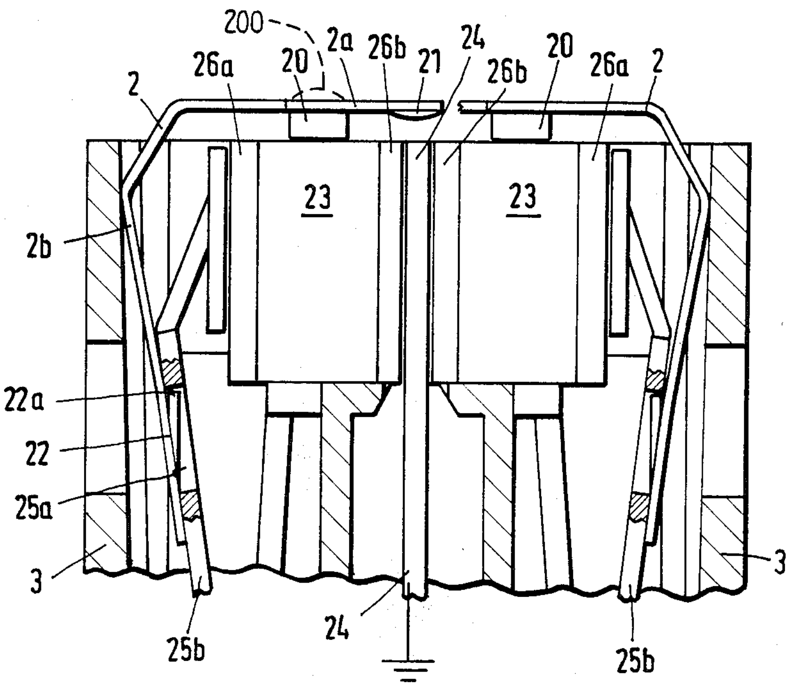
Figure 2A:
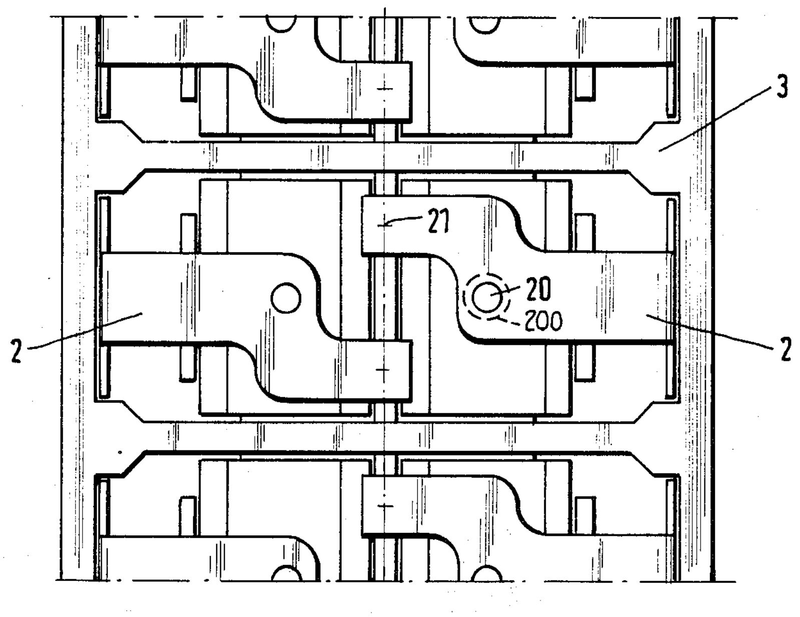
Figure 3:
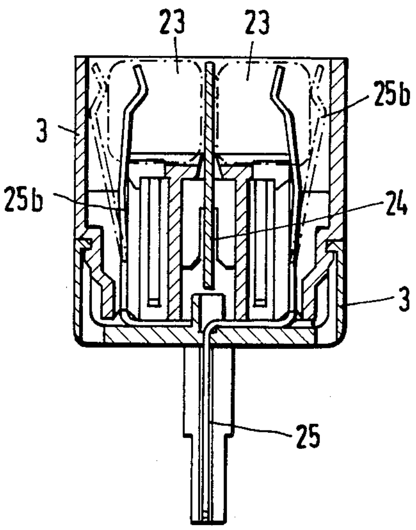
Figure 4:
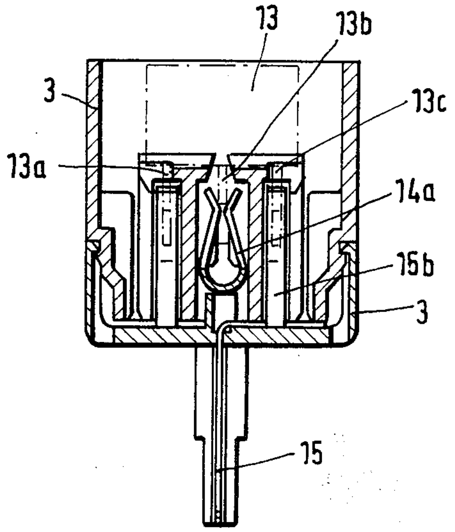

Embodiments of the invention will be described below with reference to the accompanying drawing, in which:

FIG. 1 shows the upper part of an overvoltage arrester magazine with a built-in two-way arrester and with two S-shapd clip springs shown in section;

FIG. 1*a* shows a plan view of FIG. 1;

FIG. 2 shows the upper part of an overvoltage arrester magazine having two built-in button arresters of the 6×6- (6×8)-type and including two L-shaped clip springs shown in section;

FIG. 2*a* shows a plan view of FIG. 2;

FIG. 3 shows the voltage arrester magazine for button arresters of the 6×6- or 6×8-type in section; and FIG. 4 shows a section through the overvoltage arrester magazine for two-way arresters.

The overvoltage arrester magazine 3 shown in FIG. 1 and FIG. 4 and, respectively, in FIG. 2 and FIG. 3 is plugged into a known LSA-PLUS terminal block (not shown) to protect the a-wires and b-wires against overvoltages.

FIG. 1 shows an overvoltage magazine 3 including a two-way arrester 13 the contact legs 13*a* and 13*c* of which are plugged into the contact elements 15*b* of the contact spring 15.

The central contact leg 13*b* is plugged into the ground contact element 14*a*.

In case of an overvoltage an arc will be developed between the poles 16*a* and 16*b* of the one spark gap and, respectively, the poles 16*c* and 16*b* of the other spark gap of the two-way arrester 13, said arc resulting in a temperature increase. This increased temperature will destroy the arrester and lead to serious damage of the overvoltage arrester magazine 3.

To prevent such damage an S-shaped clip spring 1 is plugged in according to the invention, said clip spring including a solder preform 10 and a switch contact 11 on its one leg 1*a* and a latching means 12 on its other leg 1*b*.

The latching means 12 is provided with two resilient tabs 12*a* (only one visible) engaging beneath the two-way arrester 13.

Due to this latching and spring action the S-shaped clip spring 1 is retained in the overvoltage arrester magazine 3.

The solder preform 10 provided on the leg 1*a* may be either riveted 100 thereto or merely wedged between leg 1*a* and two-way arrester 13.

Wedging-in of the solder preform 10 offers the advantage that upon melting-off of the solder preform it will not be required to replace the S-shaped clip spring but merely the solder preform 10.

In the assembled state of the S-shaped clip spring 1 the solder preform 10—as also shown in FIG. 1*a*—rests on the outer diameter of the two-way arrester 13, whereby the switch contact 11 is held in spaced relationship to the pole 16*b* of the two-way arrester 13, which pole is connected to ground potential 14.

In case of an overvoltage and subsequent melting-off of the solder preform 10 the S-shaped clip spring 1 will bridge the poles 16*a* and 16*b* and, respectively, 16*b* and 16*c*, whereby the arc developed in the two-way arrester 13 is short-circuited and the overcurrent will flow off via ground potential 14. Thereby any damage to the two-way arrester 13 and to the overvoltage arrester magazine 3 is prevented.

If instead of the two-way arresters 13 button arresters 23 of the 6×6-type or the 6×8-type are required, heat protection will also be possible with an L-shaped clip spring 2.

As will be apparent from FIG. 2, said L-shaped clip spring 2 may also be plugged into the overvoltage arrester magazine 3 at a later date.

As will be apparent from FIG. 3, the button arresters 23 of the 6×6-type and 6×8-type are contacted through a contact element 25*b* of the contact spring 25.

The contact element 25*b* is provided with an opening 25*a* in which the resilient tab 22*a* of the latching means 22 provided on the leg 2*b* of the L-shaped clip spring 2 will be locked.

Analogously to the S-shaped clip spring 1, the L-shaped clip spring 2 also is retained in the overvoltage arrester magazine 3 due to the latching and spring action.

As will also be apparent from FIG. 2*a*, the solder preform 20 provided on the leg 2*a* and may have rivet 200 for attachment in the assembled state of the L-shaped clip spring 2 also rests on the outer diameter of the button arrester 23, whereby the switch contact 21 is held in spaced relationship to the ground potential 24. Here, too, in case of an overcurrent of longer duration and upon heating of the button arrester 23 the solder preform 20 will melt, whereby the switch contact 21 will be connected to ground potential 24, thereby resulting in a short-circuit between the poles 26*a* and 26*b* of the button arrester 23.

The overvoltage is unable to cause any damage to the button arrester 23 and to the overvoltage arrester magazine 3.

What is claimed is:

1. A heat protection device for overvoltage arresters for use in telecommunications, comprising a resilient element having:

a solder preform;

a switch contact; and an S-shaped clip spring, one leg thereof being supported by the solder preform and the switch contact and the other leg thereof having latching means including two resilient tabs, said latching means engaging in an overvoltage arrester magazine beneath a two-way overvoltage arrester, the clip spring being supported by the inner wall of the overvoltage arrester magazine.

2. A device as claimed in claim 1, characterized in that the solder preform rests on the outer diameter of the arrester and thereby keeps the switch contact in spaced relationship to a respective ground potential.

3. A device as claimed in claim 2, wherein the solder preform is retained by one of wedging between the arrester and the clip spring and fixedly joining to the clip spring through a rivet joint.

4. A heat protection device for overvoltage arresters for use in telecommunication, comprising a resilient element having:

a solder preform;

a switch contact; and an L-shaped clip spring, one leg thereof being supported by the solder preform and the switch contact and the other leg thereof having latching means including a resilient tab, said latching means engaging in an overvoltage arrester magazine in an opening of the contact spring of a single-type arrester, the clip spring being supported by the inner wall of the overvoltage arrester magazine.

5. A device as claimed in claim 4, characterized in:

that the solder preform rests on the outer diameter of the arrester and thereby keeps the switch contact in spaced relationship to a respective ground potential.

6. A device as claimed in claim 5, wherein the solder preform is retained by wedging between the arrester and the clip spring is fixedly joined to the clip spring through a rivet joint.

* * * * *